United States Patent [19]

Martin

[11] Patent Number: 4,491,059
[45] Date of Patent: Jan. 1, 1985

[54] FLUID ACTUATOR WITH MANUAL LOCK RELEASE AND LOCK POSITION SENSOR

[75] Inventor: Eugene J. Martin, Portage, Mich.

[73] Assignee: Pneumo Corporation, Boston, Mass.

[21] Appl. No.: 362,644

[22] Filed: Mar. 29, 1982

[51] Int. Cl.³ .............................................. F01B 31/12
[52] U.S. Cl. ......................................... 92/5 L; 92/14; 92/17; 92/21 MR; 92/28; 92/33
[58] Field of Search .................... 92/5 R, 5 L, 14, 17, 92/21 R, 21 MR, 33, 23, 24, 25, 28, 27

[56] References Cited

U.S. PATENT DOCUMENTS

| | | | |
|---|---|---|---|
| 2,434,828 | 1/1948 | Ashton et al. | 92/21 MR |
| 3,414,693 | 12/1968 | Watson et al. | 92/5 R |
| 3,621,763 | 11/1971 | Geyer | 92/17 |
| 4,240,332 | 12/1980 | Deutsch | 92/21 MR |
| 4,365,539 | 12/1982 | Martin et al. | 92/17 |

*Primary Examiner*—Robert E. Garrett
*Assistant Examiner*—Scott L. Moritz
*Attorney, Agent, or Firm*—Maky, Renner, Otto & Boisselle

[57] ABSTRACT

Fluid actuator includes a lock mechanism for releasably locking the actuator against movement, and a lock release assembly including a lock piston engageable with a toggle linkage upon application of fluid pressure to the lock piston to release the lock mechanism. The toggle linkage is fixedly mounted on a rotatable cross shaft which may also be manually rotated by manual rotation of an external lock release lever attached to one end of the cross shaft for effecting manual release of the lock mechanism. The engaged or disengaged condition of the lock mechanism may be sensed electrically as by providing a target on the external lock release lever for movement therewith toward and away from a proximity switch.

13 Claims, 5 Drawing Figures

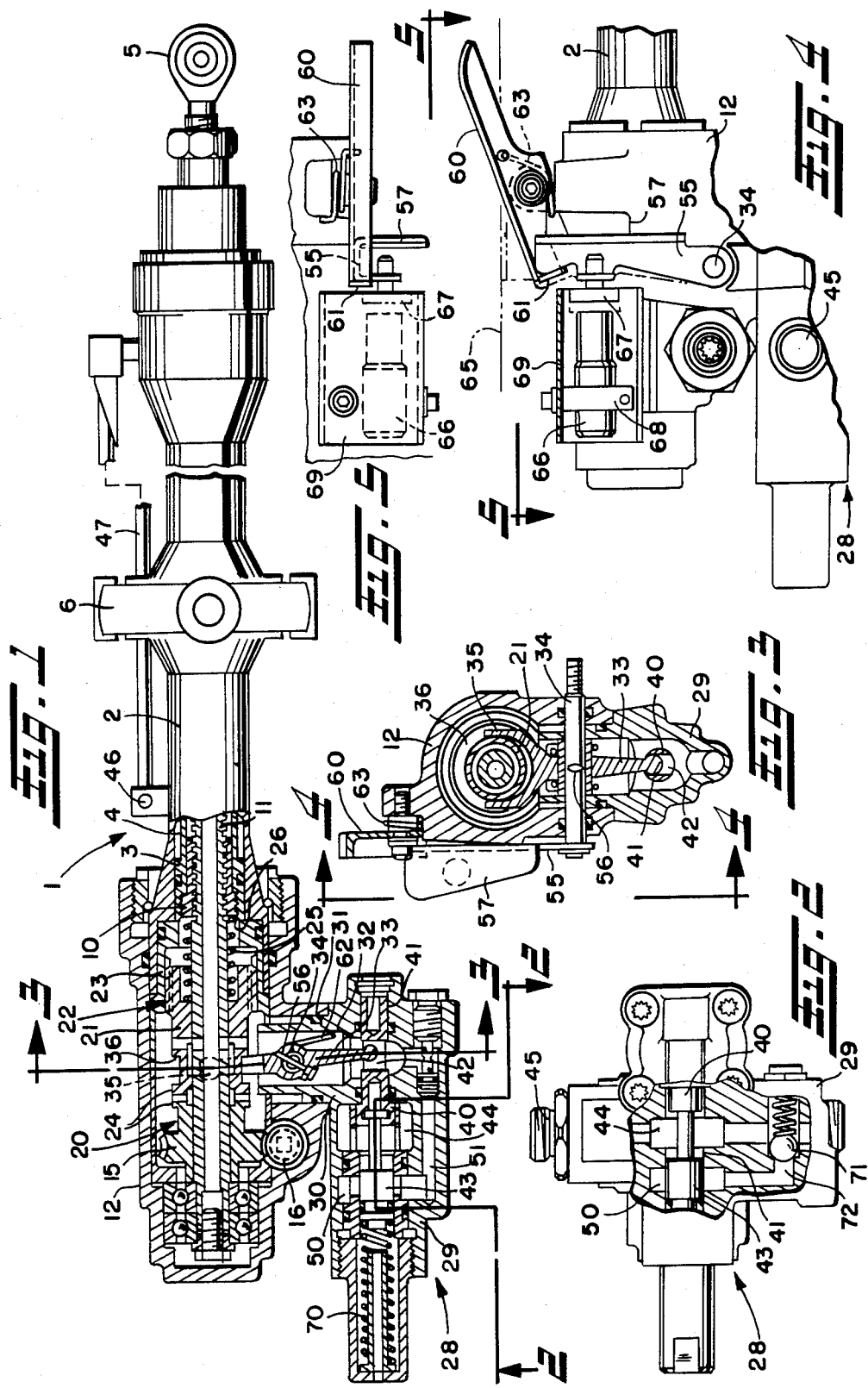

FLUID ACTUATOR WITH MANUAL LOCK RELEASE AND LOCK POSITION SENSOR

BACKGROUND OF THE INVENTION

This invention relates generally as indicated to a fluid actuator with manual lock release and lock position sensor.

In certain actuator installations, for example, when the actuator is used to actuate the thrust reversers for a jet engine, a lock mechanism is utilized to lock the actuator against movement in one end position. Before the actuator can be extended, the lock mechanism must be released as by fluid pressure actuation of a lock release assembly. One form of such an actuator is disclosed in copending U.S. application Ser. No. 352,046, filed Feb. 24, 1982, the disclosure of which is incorporated herein by reference. When fluid pressure is admitted to the lock release assembly, a lock release force is transmitted to the movable lock part by a toggle type lock release lever therebetween.

To facilitate installation as well as testing and/or replacement of such an actuator, it is desirable to provide of manual release of such lock mechanism. Also, once the lock mechanism has been manually released, it is desirable to retain the lock mechanism in the lock disengaging position without having to continually apply a manual lock releasing force thereto. Moreover, for safety reasons and the like, it is desirable to provide a signal indicating whether the lock mechanism is in the locked or unlocked condition.

SUMMARY OF THE INVENTION

With the foregoing in mind, it is a principal object of this invention to provide a fluid actuator of the type described including a lock mechanism and lock release assembly which may be manually actuated to release the lock mechanism.

Another object is to provide such an actuator in which an external manual force may be applied to the lock release assembly for effecting manual release of the lock mechanism.

Still another object is to provide such an actuator in which both a toggle type lock release lever and a manually rotatable external lock release lever are attached to a common cross shaft for rotation as a unit, whereby manual rotation of the external lock release lever causes a corresponding rotational movement of the toggle lever.

A further object is to provide such an actuator in which the external lock release lever may be mechanically held in the unlocked position without having to continually apply a manual lock releasing force thereto.

Yet another object is to provide such an actuator in which the mechanical force that is used to retain the external lock release lever in the unlocked condition following manual release of the lock mechanism may be automatically released.

Still another object is to provide such an actuator in which both the locked and unlocked condition of the lock mechanism may be electrically sensed.

Another object is to provide such an actuator in which both the locked and unlocked condition of the lock mechanism may be determined by monitoring the position of the external lock release lever.

Yet another object is to provide such an actuator in which the position of the external lock release lever is monitored by a proximity switch.

These and other objects of the present invention may be achieved as by providing the actuator with a lock mechanism for locking the actuator in one position, and a lock release assembly including a lock piston engageable with a toggle linkage upon application of fluid pressure thereto to release the lock mechanism. The toggle linkage is fixedly secured to a manually rotatable cross shaft, whereby manual rotation of the cross shaft will also cause release of the lock mechanism. An external lock release lever is attached to one end of the cross shaft for effecting manual rotation thereof.

When the lock mechanism is manually released, the external lock release lever may be retained in the lock disengaging position by engagement by a pivotally mounted lock-out lever, thus freeing the operator's hands. A torsion spring or the like acting on the lock-out lever will automatically disengage the lock-out lever from the lock release lever when the actuator has been extended a sufficient distance to eliminate any forces acting on the lock mechanism tending to reengage the lock mechanism. If the lock-out lever should not release by itself, a cowl door or the like will hit the lock-out lever and move same out of engagement with the lock release lever during closing of the cowl door.

Both the locked and unlocked condition of the lock mechanism may also be sensed as by providing a target on the external lock release lever for movement therewith toward and away from a proximity switch. The proximity switch provides an electrical signal indicating the locked or unlocked condition of the lock mechanism in accordance with the proximity of the target to the switch.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary side elevation view partly in section of a preferred form of fluid actuator in accordance with the present invention;

FIG. 2 is a fragmentary plan view of the lock release assembly for the actuator of FIG. 1 with portions broken away substantially along the plane of the line 2—2 to show the return flow path from the actuator bypassing the lock piston;

FIG. 3 is a fragmentary transverse section through the actuator of FIG. 1 taken along the plane of the line 3—3 thereof to show the interconnection between the external and internal lock release levers;

FIG. 4 is a fragmentary side elevation view of the actuator as seen from the plane of the line 4—4 of FIG. 3; and FIG. 5 is a fragmentary top plan view of the actuator as seen from the plane of the line 5—5 of FIG. 4.

DETAILED DESCRIPTION OF THE PREFERRED EMBODIMENT

In FIG. 1 there is shown a fluid actuator 1 comprising a cylinder 2 containing a piston 3 axially movable therewithin. Attached to the piston is a hollow rod 4 which extends through the rod end of the cylinder and has a rod end assembly 5 on its outboard end to facilitate connection to the movable or stationary part of the device to be actuated, for example, the thrust reversers for a jet engine on an aircraft. A suitable trunnion mount 6 may also be provided on the cylinder to facilitate connection to the other part of the device to be actuated.

Attached to the piston is a high lead Acme nut 10 which is coupled to a mating Acme screw shaft 11. One end of the screw shaft may be journaled in suitable bearings within an actuator housing 12 at the head end of the cylinder, whereas the other end of the screw shaft extends into the hollow piston rod 4 a substantial distance beyond the nut. As the piston moves back and forth in the cylinder, the screw shaft rotates at a speed proportional to the velocity of the piston. A high lead worm wheel 15 attached to the screw shaft mates with a worm shaft 16 mounted for rotation within a transverse bore in the actuator housing. Since the speed of rotation of the worm shaft is also proportional to the velocity of the piston rod, when the worm shafts of two or more actuators are connected together by a synchronous drive or the like, they will be mechanically synchronized in both position and motion, as well known in the art.

When the actuator is in the retracted or stowed position shown in FIG. 1, such actuator may be locked against movement by a lock mechanism 20 which may, for example, be of the type disclosed in the aforementioned copending U.S. application Ser. No. 352,046. Such lock mechanism comprises a movable lock sleeve 21 axially movable within the actuator housing toward and away from the adjacent end of the worm wheel 15. The lock sleeve has a central opening through which the screw shaft 11 extends, with sufficient clearance therebetween to permit rotation of the screw shaft relative to the lock sleeve. To prevent rotation of the lock sleeve within the actuator housing while permitting limited axial movement therewithin, a splined connection 22 is provided between the movable lock sleeve and a piston stop 23 within the actuator housing.

The adjacent end faces of the worm gear 15 and movable lock sleeve 21 have cooperating lock teeth 24 thereon with ramp angles which when engaged permit ratcheting of the worm wheel relative to the movable lock sleeve during retraction of the piston but not during extension thereof. Accordingly, the piston will continue to retract until it engages the retract stop 23. However, if at any time during such ratcheting an attempt is made to reverse the piston direction, the lock teeth will instantly engage thus locking the screw shaft 11 against rotation and preventing the piston from extending. When the piston is fully retracted, the movable lock sleeve is normally maintained in engagement with the worm wheel by a lock spring 25 interposed between the movable lock sleeve and piston head 26. During retraction of the actuator, as the piston approaches the end of its stroke, the piston head compresses the lock spring, causing the teeth on the movable lock sleeve to move into engagement with the teeth on the worm gear.

Before the actuator can be extended, the lock sleeve 21 must be moved away from the worm gear 15 to disengage the lock teeth 24. With the lock teeth disengaged, the actuator may be extended by application of system pressure to the extend side of the actuator.

The lock mechanism may be released as by actuation of a sequence-power valve 28 which may be of the type disclosed in the aforementioned U.S. application Ser. No. 352,046. As shown, such sequence-power valve may be contained in a separate housing 29 having a generally right angle extension 30 at one end adapted to be received in a valve port 31 in one side of the actuator housing and releasably retained in place as by bolts or the like. The extension contains a transverse bore 32 in which a toggle type lock release lever 33 is mounted on a cross shaft 34 for limited pivotal movement. The inner end of the lock release lever extends into the actuator housing and has a fork 35 thereon surrounding the movable lock sleeve 21. When the lever is pivoted about the shaft in a generally clockwise direction as viewed in FIG. 1, the fork will engage a shoulder 36 on the movable lock sleeve thus forcing the movable lock sleeve away from the worm gear 15 to disengage the lock teeth 24.

To effect such pivotal movement of the lock release lever 33, a movable lock plunger 40 is provided in a longitudinal bore 41 in the sequence-power valve housing extending in a direction generally parallel to the longitudinal axis of the actuator cylinder. The lock plunger has a longitudinal slot 42 therein which receives the outer end of the lock release lever. Also contained in the longitudinal bore 41 is a lock piston 43 which is suitably connected to the lock plunger 40 for movement therewith. The lock piston has a differential area which is acted upon by fluid pressure admitted to a lock-in annulus 44 within the bore 41 through an exterior port 45 (see FIG. 2) to cause the lock piston to move to the left as viewed in FIG. 1, dragging the lock plunger with it. This causes the lock release lever 33 to pivot about the shaft 34 and move the lock sleeve 21 axially inwardly against the force of the lock spring 25 to disengage the lock sleeve from the worm gear 15.

Before system pressure is admitted to the lock-in annulus to release the lock, such system pressure is desirably applied to the retract side of the actuator through a retract port 46 and porting tube 47 to remove any axial tension loads on the actuator which might otherwise interfere with release of the lock. Then, with system pressure still applied to the retract port, system pressure is also applied to the lock-in annulus to release the lock as previously described.

After the lock piston 43 has moved far enough to release the lock, the system pressure acting on the lock piston may be ported to the extend side of the actuator through another annulus 50 in the lock piston bore which is uncovered by the lock piston following such movement. This annulus communicates with the extend side of the actuator through a passageway 51 in the sequence-power valve housing 29 which is connected to the outer end of the transverse bore 32 in such housing. The fluid entering such transverse bore flows around the lock plunger 40 and lock release lever 33 and into the extend side of the actuator through the valve port 31 in the actuator housing 12. Since the area of the piston 10 exposed to the extend pressure is greater than that exposed to the retract pressure, the actuator will extend. As the piston moves away from the lock spring 25, the lock spring quickly reaches its free length, at which point it is no longer effective in applying a locking force to the movable lock sleeve 21.

Manual release of the lock mechanism 20 may also be accomplished by actuation of a manually movable lock release lever 55 on one end of the cross shaft 34 which extends outwardly beyond the actuator housing 12 as shown in FIGS. 3 and 4. The manually movable lock release lever 55 is fixed to the outer end of the cross shaft 34, whereby manual movement of the lock release lever will cause the cross shaft to rotate. Also, the toggle lever 33 is connected to the cross shaft as by a pin 56, whereby the toggle lever will also rotate during manual rotation of the cross shaft.

A transversely extending thumb plate 57 may be provided on the lever 55 to facilitate application of hand pressure thereto for manually releasing the lock. Movement of the lever 55 to the right as viewed in FIGS. 4 and 5 will cause the cross shaft 34 and thus the toggle lever 33 connected thereto to rotate in a generally clockwise direction as seen in FIG. 1 thus forcing the movable lock sleeve 21 out of engagement with the worm gear 15 in the manner previously described. A lock-out lever 60 may also be provided on the actuator housing 12 for releasably retaining the manually movable lock release lever 55 in the lock disengaging position, thus freeing the operator's hands. As best seen in FIGS. 4 and 5, such lock-out lever is mounted for pivotal movement intermediate the ends thereof, and has a down-turned flange 61 on one end engageable with the upper end of the manually movable lever 55 after the manually movable lever has been moved to the lock disengaging position and the lock-out lever is pivoted in a generally counter-clockwise direction as shown in FIG. 4.

After the lock has been manually released, the actuator may be extended mechanically by rotating the worm shaft 16 using a suitable mechanical drive mechanism connected thereto. Once the actuator has been extended a sufficient distance, for example, slightly more than 3/10 inch, the lock spring 25 will reach its free length, thus eliminating any spring force tending to reengage the lock. From that point on a light torsion spring 62 acting on the toggle lever 33 will maintain the movable lock sleeve 21 out of engagement with the worm wheel 15 so that the actuator does not suddenly stop. Accordingly, there is no longer any need for the lock-out lever 60 to hold the manually movable lock release lever 55 in the lock disengaging position. Therefore, a small torsion spring 63 or the like may be provided on the lock-out lever 60 for automatically disengaging the lock-out lever from the lock release lever 55 and returning the lock-out lever to its original position when the lock spring 25 is no longer effective in applying a spring force tending to reengage the lock.

If for some reason the lock-out lever 60 should not release by itself, when the operator closes a cowl door 65 or the like surrounding the jet engine after his work has been completed, the cowl door will engage the outer end of the lock-out lever causing it to pivot away from the lock release lever to the phantom line position shown in FIG. 4 so as not to interfere with subsequent reengagement of the lock.

A proximity switch 66 may also be mounted on the actuator housing 12 adjacent the manually movable lock release lever 55 to provide an electrical signal which may for example turn a light on or off indicating to the pilot the locked or unlocked condition of the lock mechanism in accordance with the proximity of a target 67 carried by the lock release lever to the proximity switch. When the lock mechanism is engaged, the lever 55 will be in its forwardmost position with the target 67 at the closest point to the proximity switch as shown in phantom lines in FIG. 4, whereas when the lock is released, the lever will be at its rearwardmost point, with the target at the furthest point from the proximity switch as shown in solid lines in FIG. 4. The proximity switch may be supported by a bracket 68 within a separate housing 69 on the actuator housing 12 to permit adjustment of the position of the proximity switch and/or removal and replacement as required.

To retract the actuator, the pressure acting on the extend side of the actuator is reduced, as by connecting the pressure port 45 and thus the lock-in annulus 44 in communication therewith to return pressure, while still maintaining system pressure on the retract side of the actuator. With reduced pressure at the lock-in annulus, a return spring 70 acting on the lock piston 43 will cause the lock piston to return to its original position shown in FIG. 1 blocking fluid flow from the extend side of the actuator through the lock valve bore 41. However, return flow from the extend side of the actuator still occurs through a check valve 71 in another passage 72 in the valve housing 29 providing communication between the two annuluses 50, 44 through such check valve as shown in FIG. 2.

As the actuator retracts, the lock mechanism 20 is prevented from prematurely engaging by the torsion spring 62 which maintains the toggle release lever 33 in the unlocking position until the piston 3 engages the lock spring 25 and compresses same sufficiently to overcome the relatively light force of the torsion spring and force the lock teeth 24 into engagement. This normally occurs within the last 3/10 inch or so of the retract stroke. However, the actuator will continue to move in the stow direction until the actuator piston engages the internal stop 23 because of the torque developed by the screw shaft 11 and the ramp angles of the lock teeth which cause the lock teeth to ratchet over each other. When the actuator piston engages the retract stop, the screw shaft also stops, and since the lock teeth are already in engagement with each other, any motion that tends to extend the actuator will cause the locking faces of the lock teeth to engage thus providing a positive lock against such motion.

From the foregoing, it will now be apparent that the fluid actuator of the present invention provides a very simple and effective means for manually releasing the lock mechanism, by driving an external lock release lever off the same cross shaft for the internal toggle release lever, whereby manual rotation of the external lock release lever will also cause the internal toggle lever to rotate. When the lock mechanism is manually released, the external lock release lever may be retained in the lock disengaging position by engagement by a pivotally mounted lock-out lever. However, the lock-out lever may also be automatically disengaged from the external lock release lever when the actuator has been extended a predetermined distance, or when the outer end of the lock-out lever is hit during shutting of a cowl door or the like. Also, both the locked and unlocked condition of the lock mechanism may be electrically sensed by monitoring the position of the external lock release lever.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder containing a piston-rod assembly that is extendible under pressure, releasable lock means for releasably locking said piston-rod assembly against movement, and lock release means for releasing said lock means, said lock release means including a toggle lever movable in a direction to release said lock means, said toggle lever being mounted on a rotatable cross shaft for rotation therewith, and means for applying an external rotational force directly to said cross shaft to cause said toggle lever to rotate in a direction to release said lock means, said means for applying an external rotational force to said cross shaft comprising a manually rotatable external lock release lever attached to one end of said cross shaft, whereby rotation of said lock release lever causes a corresponding rotational movement of said toggle lever, said lock means including a first part axially movable into and out of locking engagement with a second part, said toggle lever being engageable with said first part during such rotational movement of said toggle lever to cause axial movement of said first part out of locking engagement with said second part.

2. The actuator of claim 1 further comprising a fluid pressure operated valve piston for effecting pivotal movement of said toggle lever, said external lock release lever being movable with said toggle lever to provide an external signal indicating the locked or unlocked condition of said lock means.

3. The actuator of claim 2 further comprising a proximity switch for sensing the locked or unlocked condition of said lock means in accordance with the proximity of said external lock release lever to said proximity switch.

4. The actuator of claim 3 wherein there is a target on said external lock release lever that is sensed by said proximity switch.

5. The actuator of claim 3 further comprising a housing surrounding said proximity switch, and means for adjusting the position of said proximity switch within said housing.

6. The actuator of claim 1 wherein said external lock release lever includes a transversely extending thumb plate to facilitate application of hand pressure to said external lock release lever.

7. The actuator of claim 1 wherein said lock release means is externally mounted on one side of said actuator, and said toggle lever extends into said actuator for transmitting a lock release force from said lock release means to said releasable lock means.

8. The actuator of claim 7 wherein said lock release means is contained in a housing, said cross shaft being rotatably mounted in said housing, and said toggle lever being mounted on said cross shaft within said housing for rotation with said cross shaft.

9. The actuator of claim 8 wherein said means for applying an external rotational force to said cross shaft comprises a manually rotatable external lock release lever attached to one end of said cross shaft externally of said housing, whereby rotation of said external lock release lever causes a corresponding rotational movement of said toggle lever.

10. The actuator of claim 9 further comprising proximity switch means for sensing the locked or unlocked condition of said lock means in accordance with the proximity of said external lock release lever to said proximity switch means.

11. A fluid actuator comprising a cylinder containing a piston-rod assembly that is extendible under pressure, releasable lock means for releasably locking said piston-rod assembly against movement, and lock release means for releasing said lock means, said lock release means including a toggle lever movable in a direction to release said lock means, said toggle lever being mounted on a rotatable cross shaft for rotation therewith, and means for applying an external rotational force directly to said cross shaft to cause said toggle lever to rotate in a direction to release said lock means, said means for applying an external rotational force to said cross shaft comprising a manually rotatable external lock release lever attached to one end of said cross shaft, whereby rotation of said lock release lever causes a corresponding rotational movement of said toggle lever, a lock-out lever movable into engagement with said external lock release lever for holding said lock release lever in the lock disengaging position, and spring means for disengaging said lock-out lever from said external lock release lever after said piston-cylinder assembly has been extended a predetermined amount.

12. A fluid actuator comprising a cylinder containing a piston-rod assembly that is extendible under pressure, releasable lock means for releasably locking said piston-rod assembly against movement, and lock release means for releasing said lock means, said lock release means including a toggle lever movable in a direction to release said lock means, said toggle lever being mounted on a rotational cross shaft for rotation therewith, and means for applying an external rotational force directly to said cross shaft to cause said toggle lever to rotate in a direction to release said lock means, said means for applying an external rotational force to said cross shaft comprising a manually rotatable external lock release lever attached to one end of said cross shaft, whereby rotation of said lock release lever causes a corresponding rotational movement of said toggle lever, a lock-out lever movable into engagement with said external lock release lever for holding said external lock release lever in the lock disengaging position, and cover means movable into engagement with said lock-out lever to disengage said lock-out lever from said external lock release lever.

13. A fluid actuator comprising a cylinder containing a piston-rod assembly that is extendible under pressure, releasable lock means for releasably locking said piston-rod assembly against movement, and lock release means for releasing said lock means, said lock release means including a toggle lever movable in a direction to release said lock means, said toggle lever being mounted on a rotatable cross shaft for rotation therewith, and means for applying an external rotational force directly to said cross shaft to cause said toggle lever to rotate in a direction to release said lock means, said lock release means being contained in a housing, said cross shaft being rotatably mounted in said housing, and said toggle lever being mounted on said cross shaft within said housing for rotation with said cross shaft, said means for applying an external rotational force to said cross shaft comprising a manually rotatable external lock release lever attached to one end of said cross shaft externally of said housing, whereby rotation of said external lock release lever causes a corresponding rotational movement of said toggle lever, one end of said toggle lever being engageable with said lock means to release same upon rotation of said toggle lever in the lock disengaging direction, and fluid pressure operated piston means contained within said housing for applying a force to the other end of said toggle lever for effecting such rotational movement of said toggle lever in the lock disengaging direction.

\* \* \* \* \*